United States Patent Office 3,528,772
Patented Sept. 15, 1970

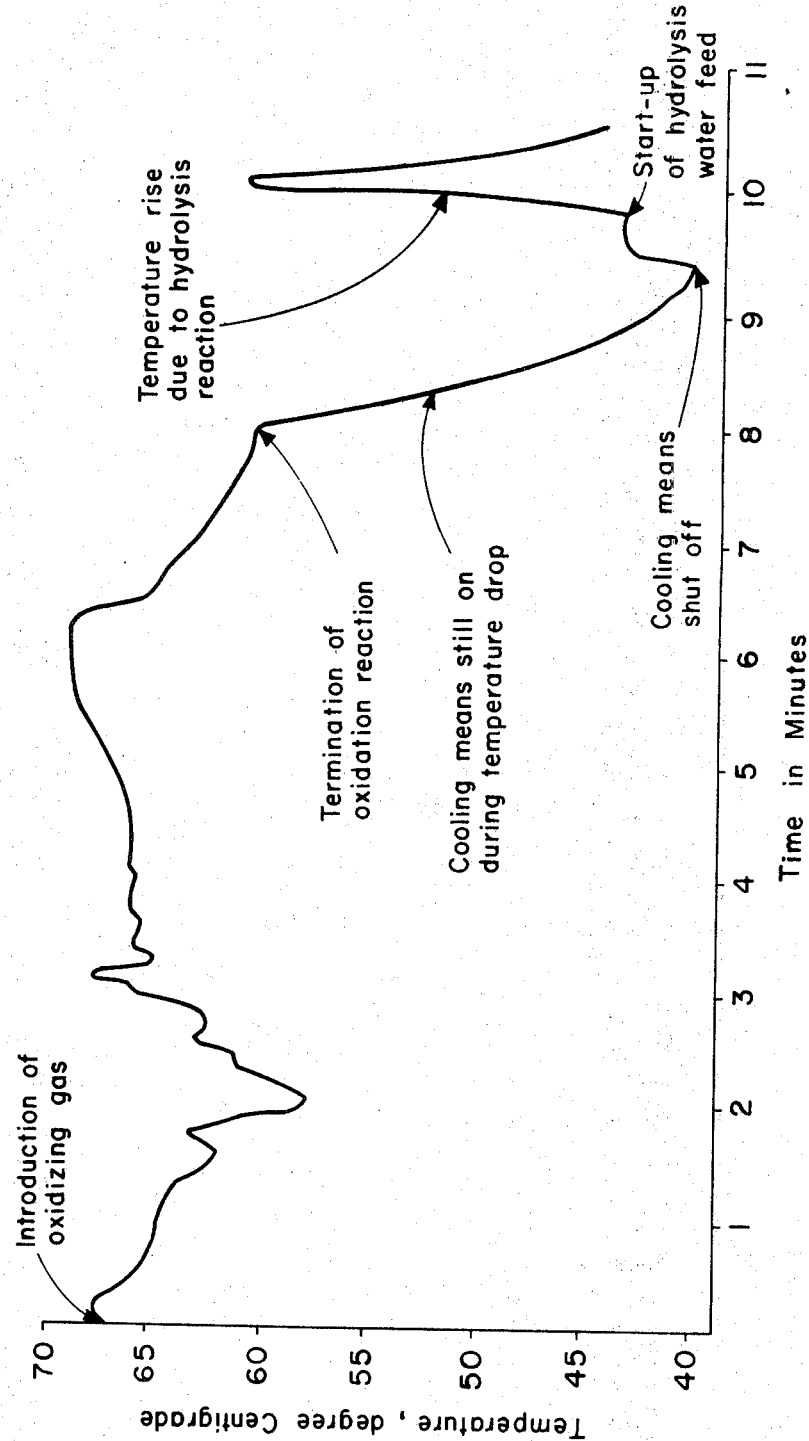

3,528,772
PROCESS FOR PREPARATION OF ORTHO-PHOSPHOROUS ACID
David D. Whyte, Wyoming, and Phillip F. Pflaumer, Colerain Township, Hamilton County, Ohio, assignors to The Procter & Gamble Company, Cincinnati, Ohio, a corporation of Ohio
Filed Oct. 26, 1967, Ser. No. 678,280
Int. Cl. C01b 25/20
U.S. Cl. 23—165       12 Claims

ABSTRACT OF THE DISCLOSURE

A process for preparing orthophosphorous acid which comprises the steps of (1) preparing a dispersion of phosphorus in a substantially anhydrous organic medium containing an aliphatic carboxylic acid having up to about 6 carbon atoms; (2) introducing an oxidizing gas into said dispersion whereby the phosphorus is oxidized in situ to an anhydride of trivalent phophorus which reacts immediately with said aliphatic carboxylic acid to form a phosphite intermediate reaction product (3) hydrolyzing said phosphite intermediate reaction product to form orthophosphorus acid by adding at least 6 moles of water per mole of phosphorus, said hydrolysis step commencing prior to any substantial rearrangement of said phosphite intermediate reaction product to a product containing carbon-to-phosphorus bonds. In determining the maximum point in time, theta (as time in minutes), by which the hydrolysis step must commence, the following equation should be applied in the manner described below:

Time in minutes $\leq 380$ $$-\left[\left(\frac{\text{moles of phosphorus}}{\text{moles of aliphatic carboxylic acid}}\right) \times (3{,}770 + 20.6T)\right]$$

BACKGROUND OF THE INVENTION

Field of the invention

This invention relates to an improved process for preparing orthophosphorous acid, $H_3PO_3$. Orthophosphorous acid is generally thought of as having a hydrogen atom attached directly to the phosphorus atom, although it can assume either of two tautomeric forms: $HP(O)(OH)_2$ or $P(OH)_3$. The present process provides for the production of orthophosphorous acid directly from elemental phosphorus in much higher yields than heretofore thought possibel. Moreover, this is accomplished by avoiding the use of expensive corrosive intermediates. Additionally, the process can be run continuously with high conversion rates and yields of the desired acid.

Statement concerning prior art and problems solved by the present invention

While an oxidation reaction between phosphorus and moist air is mentioned in a textbook entitled Phosphorus and Its Compounds, Volume I, by John R. Van Wazer, Interscience Publishers, Inc., New York, N.Y., 1958, the reaction product is said to contain only 18% of the original phosphorus as orthophosphorous acid and 82% consisting of 75% phosphoric acid and 7% other oxyacids. No published refinements or improvements of this reaction are known. The present invention by contrast provides conversion rates to orthophosphorous acid on the order of 75% based on original phosphorus.

Commercially, orthophosphorus acid has been prepared by several different ways, all of which are expensive. Consequently, the high cost of orthophosphorous acid has discouraged its widespread use and employment as a chemical commodity. Calcium phosphite produced as a by-product in the manufacture of calcium hypophosphite can be treated with sulfuric acid to make orthophosphoric acid. More usually, orthophosphorous acid is prepared by hydrolyzing phosphorus trichloride. While this latter process can be run continuously, it involves expensive, dangerous and corrosive intermediates, e.g., hydrogen chloride. The best yields in such a process are found when the water for hydrolysis is present as a concentrated solution of hydrochloric acid and the mixture is kept cool throughout the reaction.

A statement is made in the text mentioned above, Phosphorus and Its Compounds, regarding a third reaction for preparing orthophosphorous acid. "Orthophosphorous acid can also be made by treating its anhydride $P_4O_6$ with water; but this preparative method is never used because of the difficulty in preparing and isolating phosphorus trioxide." Even if this reaction could be employed, however, there is the serious danger of forming either phosphine, which is a highly toxic gas, or red phosphorus, which is a highly undesirable insoluble form of phosphorus.

The same text on page 283 states that "$P_4O_6$ is formed as an intermediate product in the oxidation of elemental phosphorus, but that under most conditions, the phosphorus trioxide immediately decomposes so that the main product of oxidation of elemental phosphorus is usually a mixture of phosphorus tetroxide and phosphorus pentoxide." These latter two compounds would be converted on hydrolysis almost exclusively to phosphoric acid or other pentavalent phosphate salts rather than orthophosphorous acid which is the primary object of the present invention.

The prior art, therefore, while recognizing the long-felt need and desirability of providing a safe, efficient, inexpensive and continuous process for preparing orthophosphorous acid, has failed to foresee how such a process might be obtained. This present invention does so far the first time.

SUMMARY OF THE INVENTION AND DESCRIPTION OF THE PREFERRED EMBODIMENTS

According to the present invention, it has now been discovered that orthophosphorous acid can be prepared by a process which comprises (1) preparing a dispersion of phosphorus in a substantially anhydrous organic medium containing an aliphatic carboxylic acid having up to about 6 carbon atoms, (2) introducing an oxidizing gas into said dispersion with vigorous mixing while the dispersion has a temperature in the range of from about 20° C. to about 100° C. whereby the phosphorus is oxidized in situ to an anhydride of trivalent phosphorus which reacts immediately with said aliphatic carboxylic acid to form a phosphite intermediate reaction product.

(3) hydrolyzing said phosphite intermediate reaction product to form orthophosphorous acid by adding at least 6 moles of water per each mole of phosphorus, said hydrolysis step commencing prior to substantial rearrangement of said phosphite intermediate reaction product to a product containing carbon-to-phosphorus bonds, the maximum point in time prior to which the hydrolysis step must commence being determined by the equation:

Time in minutes $\leq 380$ $$-\left[\left(\frac{\text{moles of phosphorus}}{\text{moles of aliphatic carboxylic acid}}\right) \times (3{,}770 + 20.6T)\right]$$

Elemental phosphorus does not react with aliphatic carboxylic acids at room temperatures. It is necessary to convert the phosphorus to a reactive oxidized species. A critical feature of the present invention is that this reactive state is formed in situ in the presence of an aliphatic carboxylic acid. For purposes of describing and understanding this invention, a reactive oxidized phosphorus species is referred to as an anhydride of trivalent phosphorus. It should be noted that this is a transition state and more explicit characterization of the reactive oxidized phosphorus is not known. The chemistry of the in situ conversion of phosphorus to a reactive state and the subsequent reaction with the carboxylic acid is not fully understood. Without limiting the invention in any way, what is believed to occur is that the reactive anhydride of trivalent phosphorus, as it is formed in situ, reacts immediately with the aliphatic carboxylic acid to form a complex intermediate reaction product referred to hereinafter as a phosphite intermediate reaction product. The phosphite intermediate reaction product unexpectedly stabilizes and maintains the anhydride of trivalent phosphorus in a trivalent state and effectively prevents it from being further oxidized to a higher oxidation state such as tetravalent and pentavalent forms. These latter forms are not readily convertible to phosphorus acid. The net result is that the overall oxidation reaction of the present invention is much more controllable than heretofore thought possible. The high degree of chemical stability of the intermediate reaction product between the anhydride of trivalent phosphorus and the aliphatic carboxylic acid is an important factor contributing to the effective control which can be exercised over the present process.

One of the advantages of the present invention is the ready availability of thet essential reactants. The essential reactants are phosphorus, an aliphatic carboxylic cid, an oxidizing gas and water for the hydrolysis reaction. The organic medium for preparing the dispersion may optionally contain an inert organic solvent or diluent to facilitate the preparation of the dispersion and otherwise afford efficient mixing. When a solvent or diluent is not employed, the organic medium is comprised only of the aliphatic carboxylic acid.

Phosphorus exists naturally as $P_4$, having a tetrahedral molecular structure. Its vapor density also corresponds to a formula of $P_4$. It is a brittle, waxy solid which has a melting point of about 44.1° C. and a boiling point of about 280° C. It is virtually insoluble in water and alcohol, moderately soluble in chloroform and benzene, and very soluble in carbon disulfide.

As mentioned above, a dispersion of phosphorus is prepared in a substantially anhydrous organic medium containing an aliphatic carboxylic acid. Suitable aliphatic carboxylic acids can be selected from the saturated fatty acid series containing up to and including 6 carbon atoms. Preferably, the aliphatic carboxylic acid should contain from 1 to 4 carbon atoms. The acids can be straight chain or branched chain acids.

Examples of suitable aliphatic monocarboxylic acids are formic acid, acetic acid, propionic acid, n-butyric acid, isobutyric acid, n-valeric acid, isovaleric acid, α-methylbutyric acid, pivalic acid, n-caproic acid and isocaproic acid, and the like. Acetic acid, because it is the most stable under oxidation conditions and for reasons discussed and illustrated below, is the preferred carboxylic acid. All of these acids are liquid at ordinary room temperatures.

The proportion of the phosphorus and carboxylic acid in the initial dispersion can vary over wide limits. Quantities of carboxylic acid in excess of stoichiometric amounts can be used. It is possible to employ as high as 60–70 carboxylic acid groups per mole of phosphorus. Quantities higher than this tend to undesirably slow down the rate of the reaction, and an insufficient amount adversely effects yields and conversion rates. The preferred proportion of aliphatic carboxylic acid to phosphorus is that which provides from about 10 to about 50 carboxyl groups per mole of phosphorus. On a weight basis, it has been found that a satisfactory proportion of aliphatic carboxylic acid to phosphorus is in the range of about 4:1 to about 80:1, and preferably, 6:1 to 40:1.

In preparing the dispersion of the phosphorus in the organic medium containing the aliphatic carboxylic acid, the phosphorus should be dispersed in a finely divided state. To achieve this, it may be desirable to warm the aliphatic carboxylic acid-phosphorus mixture to about the melting point of the phosphorus, i.e., 44.1/ C. The mean diameter of the phosphorus particles should be less than about 2 centimeters, and preferably less than 2 millimeters. The minimum size for the particles is relatively unimportant and can be as small as a single molecule of phosphorus. Particles which tend to be larger than about 2 centimeters can be used also, but they provide somewhat less satisfactory results in terms of efficiency and percents of conversion and yields.

The term dispersion is used herein in a broad technical sense. Thus, for example, it implies any suspension of finely divided, solid, liquid, or gaseous particles in a liquid medium. The term as used herein also covers liquid and solid dispersions of colloidal size and larger. It also covers molecular dispersions as this term is sometimes applied to true homogeneous solutions. In this latter context, the contemplation is a solution in which the waxy elemental phosphorus is dissolved in an organic medium as defined and exemplified hereinafter.

As mentioned above, the organic medium can optionally comprise an inert organic solvent or diluent. Such a material can be used to facilitate preparation of the dispersion by helping to dissolve the reactants and insuring a fluid mixture. This makes it easier to agitate and stir the organic medium and thereby effect efficient contact between the reactants. At the same time, the solvent can serve as a diluent or heat sink by absorbing a portion of the exothermic heat of reaction thereby making it easier to control the reaction. Any solvent or diluent can be used which is inert and which does not materially interfere with the desired course of the process including the oxidation and hydrolysis reactions. Examples of suitable solvents and diluents are sulfones such as di-n-propyl sulfone, $(C_3H_7)_2SO_2$ and sulfolane; halogenated hydrocarbons such as tetrachloroethane, carbon tetrachloride, chloroform and trichloroethane; ethers such as dibutyl ether $(C_4H_9)_2O$ and diglyme $(CH_3OCH_2CH_2OCH_2CH_2OCH_3)$; and the like. These and like materials can be used above or in mixtures of at least two such solvents or diluents.

If it is desired to practice the invention employing a solvent or diluent as defined above, the amount used is not critical. Any amount can be used to attain the intended purpose of good mixing, ease of conducting an operation and as an aid to control the heat of reaction. Satisfactory results can be obtained by using from about 0.1 to 20 parts by weight of the solvent or diluent for each part of carboxylic acid employed. Preferably, the proportion of solvent should be from 0.5 to 10 parts by weight of solvent to each part of carboxylic acid.

It is necessary that the reaction be carried out in a substantially anhydrous organic medium in order to form the desired oxidation resistant phosphite intermediate reaction product as described herein. Generally the starting reaction mixture should contain less than 1 mole of available water per mole of phosphorus, and preferably less than ½ mole of water per mole of phosphorus. If this amount of water is exceeded, the yield of phosphorus acid is reduced due to hydrolysis of the phosphite intermediate compounds and formation of undesirable by-products such as hypophosphorous acid.

In preparing the phosphorus dispersion, it is helpful to provide means for stirring and mixing the reactants. Such mixing aids in dispersing the phosphorus as fine particles.

In addition, it is desirable to provide vigorous stirring during the subsequent oxidation reaction.

Following the preparation of the dispersion of phosphorus in the carboxylic acid, an oxidizing gas is introduced into the dispersion with vigorous mixing. The oxidizing gas can be any oxygen-containing gas. It is possible to use air, or oxygen, and the like. If desired, the oxidizing gas can also be diluted with inert gases such as nitrogen, helium, argon and the like.

The addition of the oxidizing gas can be accomplished in many different ways consistant with the primary objective of dispersing the oxidizing gas throughout the phosphorus dispersion. For example, the oxidizing gas can be introduced or passed directly into the dispersion through appropriately disposed nozzles or inlet means. Another satisfactory method of distributing the oxidizing gas into the dispersion with sufficient agitation is to provide an air space above the dispersion in a sealed reactor and then vigorously stir the dispersion with a hollow stirrer whereby the oxidizing gas is drawn down through the stirrer and then forced outwardly and upwardly throughout the dispersion. Other equivalent methods can be used.

The pressure and flow rate of the oxidizing gas can be adjusted to contribute to agitation of the dispersed phase. The partial pressure of the oxygen can vary over wide limits, that is, between 10 p.s.i.a. and 1000 p.s.i.a., preferably between 15 p.s.i.a. and 500 p.s.i.a. The flow rate of the oxidizing gas passing into the dispersion should take into account the desired rate of reaction. It can range, however, from 0.04 mole/hour/mole of phosphorus to about 300 moles/hour/mole of phosphorus. Preferably, the rate of addition should be from .3 mole/hour/mole of phosphorus to 100 moles/hour/mole of phosphorus.

The oxidizing gas should be introduced into the phosphorus-aliphatic carboxylic acid dispersion while the dispersion has a temperature in the range of from about 20° C. to about 100° C., and preferably from 50° C. to 90° C. Temperatures below about 20° C. adversely effect reaction rates and conversion rates. Temperatures in excess of about 100° C. may tend to interfere with the formation of the necessary phosphite intermediate reaction product as described below.

The oxidation reaction time can range from 1 minute to about 2 hours; preferably, from 2 minutes to 1 hour. It has generally not been found necessary to exceed a period of 2 hours in order to obtain maximum yield and conversion rates. If the design of the equipment permits, the oxidizing gas can be introduced for a period less than 1 minute. The oxidizing gas can be passed into the dispersion continuously during the reaction periods at a suitably metered rate. Alternatively, the gas can be added stepwise or incrementally, that is, by sequential addition of oxidizing gas to the dispersion, as needed, to allow the reaction to continue at a satisfactory rate.

As mentioned above, the amount of the oxidizing gas (air, oxygen and the like) added to the system is dependent on several conditions. It has been found, however, that in order to achieve a maximum conversion of phosphorus to an anhydride of trivalent phosphorus, sufficient oxygen should be added to the reaction mixture to allow for an absorption by the phosphorus of from about 1.5 moles of oxygen to about 4.5 moles of oxygen per mole of phosphorus ($P_4$), and preferably from 2.5 to about 3.7 moles of oxygen per mole of phosphorus ($P_4$).

The dispersion can be vigorously stirred or agitated to achieve and maintain a fine particle dispersion and also to provide for good contact between the finely dispersed phosphorus and the oxidizing gas.

The phosphorus is oxidized by the oxidizing gas to form a trivalent phosphorus oxide species which is referred to herein as an anhydride of trivalent phosphorus. Anhydrides of trivalent phosphorus can be thought of as dehydration products of orthophosphorous acid. Examples are pyrophosphorous acid ($H_4P_2O_5$), phosphorous trioxide, $P_4O_6$, and the like.

Since these anhydrides or oxides are highly reactive, transition forms and since they are formed in situ, it would be difficult to recover them from the organic medium. Such a recovery step, however, is not necessary nor contemplated by this invention. On the contrary, a primary objective of the present invention is intentionally to form the anhydrides of trivalent phosphorus in the presence of the aliphatic carboxylic acid in order to take advantage of the unique property of the reaction product which is formed from these two materials. As noted above, the anhydride of trivalent phosphorus immediately reacts with the aliphatic carboxylic acid to form a phosphite intermediate reaction product which contains phosphorus-hydrogen bonding, phosphorus-oxygen-phosphorus bonding, and carbon-oxygen-phosphorus bonding. It has been discovered that this phosphite intermediate reaction product is oxidation resistant and that it retains and stabilizes the phosphorus essentially in a trivalent form in the reaction mixture. If the phosphite intermediate reaction product were not stable, further oxidation could occur resulting in the formation of a pentavalent form of phosphorus. This form, upon hydrolysis, forms pentavalent acid such as phosphoric acid. For all practical purposes, any phosphorus converted to a pentavalent form is lost to the desired reaction and will decrease the yield of the orthophosphorous. acid. For this reason, a critical aspect of the present invention is the immediate formation of a phosphite intermediate reaction product which insures a maximum level of trivalent phosphorus to form orthophosphorous acid.

In order to hydrolyze the phosphite intermediate reaction product to orthophosphorous acid, at least 6 moles of water are added to the reaction mixture per each mole of phosphorus. If less than this proportion of water is used, part of the oxidized phosphorus will remain unhydrolyzed and will interfere with the subsequent recovery of the orthophosphorus acid from the reaction mixture. There is no critical upper limit of water needed for hydrolysis. One consideration as to a satisfactory amount of water for hydrolysis is the desired final physical form of the orthophosphorus acid product. Generally, as a practical matter, the proportion of water in the hydrolysis step can be in the range of from about 0.8 to 100 parts of water per each part of phosphorus used, and preferably, from about 0.87 to about 50 parts by weight of water to phosphorus.

Although the amount of water for the hydrolysis step is not critical beyond the essential 6 moles of water, a critical factor does exist as to the point in time by which the hydrolysis step must be commenced. This is explained below and illustrated in the drawing.

The initial oxidation reaction and the subsequent reaction between the anhydride of trivalent phosphorus and the aliphatic carboxylic acid are both exothermic reactions. As understood from the preceding discussion, these two reactions are conducted virtually concurrently. It has been observed that a sudden drop in temperature of the reaction mixture occurs at the completion of the oxidation step and the reaction forming a phosphite intermediate reaction product. This sudden and marked drop in temperature signals a completion of the exothermic reaction forming the phosphite intermediate reaction product and consequently initiates a critical time period during which the hydrolysis step must begin, i.e., addition of water to the organic medium containing the phosphite intermediate reaction product. By careful investigation, it has been determined that the time which lapses between the completion of the oxidation reaction (including the reaction between the anhydride of trivalent phosphorus and the carboxylic acid), as evidenced by the drop in temperature and the beginning of the hydrolysis step, can equal but must not exceed a time in minutes as calculated by the following equation:

Theta (time in minutes) $\leq 380$
$$-\left[\left(\frac{\text{moles phosphorus}}{\text{moles aliphatic carboxylic acid}}\right) \times (3{,}770 + 20.6T)\right]$$

In this formula, T is a temperature in the range of from about 20° C. to about 100° C. at which the reaction mixture is maintained following the completion of the oxidation reaction until the commencement of the hydrolysis step. According to this formula, the maximum time for initiating the hydrolysis step would ordinarily not exceed about 320 minutes. This is determined by assigning a value to T of 20° C. As a practical matter, especially in a continuous operation, the hydrolysis step will commence directly upon the completion of the oxidation reaction. It is pointed out that the formula given above will serve as a guide to the practice of the present invention and provide a maximum time in minutes before which the hydrolysis step should begin. If the maximum time is exceeded, the result is substantially decreased conversion rates and yields of the desired orthophosphorus acid and increased yields of undesired reaction by-products containing carbon-phosphorus bonds, e.g., ethane-1-hydroxy-1,1-diphosphonic acid.

Although the hydrolysis reaction is also an exothermic one, no special precaution needs to be exercised in performing it. The temperature rises sharply upon the addition of the required minimum 6 moles of water during the hydrolysis step. Generally the hydrolysis reaction takes from about 1 minute to about 2 hours; preferably from 2 minutes to 1 hour.

The hydrolyzed reaction mixture is typically in the form of a solution and contains predominantly orthophosphorus acid and lesser amounts of phosphoric acid, unreacted aliphatic carboxylic acid, water and sometimes traces of unreacted phosphorus. The aliphatic carboxylic acid is present at substantially the level at which it was added initially. It is not consumed during either the oxidation reaction or the hydrolysis reaction. Its primary function is to react with the anhydride of trivalent phosphorus to form the phosphite intermediate reaction product. The carboxylic acid can be virtually completely recovered and, if desired, recycled back to the reaction system. Recovery can be effected very readily by ordinary and well-known steam distillation procedures. Unreacted phosphorus particles can be easily removed from the reaction mixture merely by filtering.

Following removal of the aliphatic carboxylic acid and unreacted phosphorus, the mixture of orthophosphorous acid and phosphoric acid can be used directly without any further separation or purification. For instance, the mixture of orthophosphorous acid and phosphoric acid can be directly neutralized with various alkaline materials such as the alkali metal hydroxides, carbonates and the like (NaOH, KOH, $Na_2CO_3$) to form corresponding salts. However, if it is desired to recover the orthophosphorous acid in pure form, any one of several well-known techniques can be used. For example, the aqueous solution of the acids can be concentrated to 80–90% acid and the orthophosphorous acid selectively crystallized therefrom. Alternately, as mentioned in Van Wazer (Phosphorus and Its Compounds), Volume 1, page 371, orthophosphorous acid can be purified by recrystallizing its disodium phosphite salt from aqueous solution, converting the sodium phosphite to lead phosphite with lead acetate, and then reacting the lead phosphite with hydrogen sulfide to recover phosphorous acid. Alternately, ion exchange can be used to convert the recrystallized sodium phosphite to the acid.

Orthophosphorous acid is a useful material in the preparation of valuable phosphonate compounds such as ethane-1-hydroxy-1,1-diphosphonic acid according to several new reactions and processes. One such process is described in copending patent application Ser. No. 444,031 filed Mar. 30, 1965 by Jimmie Keith Dyer. Another valuable process for preparing ethane-1-hydroxy-1,1-diphosphonic acid using orthophosphorous acid is described in copending patent application Ser. No. 443,844 filed Mar. 30, 1965 by Lawrence Rogovin, Denis Peter Brawn and John Nicholas Kalberg. Water soluble salts of ethane-1-hydroxy-1,1-diphosphonic acid are valuable detergency builders as described in U.S. Pat. 3,159,581 issued on Dec. 1, 1964, to Francis L. Diehl.

Orthophosphorous acid is also useful in preparing a cyclic tetraphosphonic acid compound as described in copending patent application Ser. No. 444,030 filed Mar. 30, 1965 by Oscar T. Quimby.

BRIEF DESCRIPTION OF THE DRAWING

A drawing forms part of the description of the present invention. It represents a typical temperature profile of the oxidation reaction involved in this process and illustrates the sharp drop in temperature which occurs upon completion of the oxidation step which includes the reaction between the anhydride of trivalent phosphorus and the aliphatic carboxylic acid to form a phosphite intermediate reaction product. The temperature profile depicted in the drawing was obtained from the practice of Example I below and is discussed in more detail in that description.

To augment the preceding detailed description of this invention, the following illustrative examples are given. They are not intended as limitations of the present invention. They serve only to specifically exemplify the preceding description. Other modifications will become apparent to those skilled in the art from a careful reading of the following examples.

Example I

A dispersion of phosphorus was prepared by charging 50 grams (0.404 mole) of phosphorus and 650 ml. (11.4 moles) of glacial acetic acid to a 1 liter stirred autoclave containing a cooling coil. The dispersion of phosphorus particles having a mean diameter of less than 2 centimeters was heated to 67° C. and oxygen was fed into the dispersion at a rate of about 5.5 grams per minute. Pressure was maintained at about 40 p.s.i.a. by addition of oxygen. The oxygen introduced into the reaction mixture oxidized the phosphorus to an anhydride of trivalent phosphorus which reacted immediately with the acetic acid to form a phosphite intermediate reaction product. The reaction temperature during the oxidation step was maintained at about 65° C. After 8 minutes reaction time, the temperature dropped sharply from about 60° C. to about 40° C. This indicated that the oxidation reaction was completed. The oxygen feed was shut off. 100 ml. of water was added to the autoclave about 1½ minutes after the oxidation reaction stopped. The average temperature of the reaction mixture prior to the commencement of the hydrolysis step was about 55° C. During the hydrolysis reaction the temperature climbed sharply from about 44° C. to about 63° C. The product was removed from the autoclave, refluxed for 1 hour, and analyzed by $P^{31}$ NMR. Essentially all of the phosphorus had been oxidized. Analysis showed that the product was comprised of 74 mole percent orthophosphorous acid and 26 mole percent phosphoric acid.

A temperature profile of the oxidation and hydrolysis reactions during this example is presented in the drawing. In this instance, a cooling coil was employed to control the reaction temperature. The cool water was still on when the oxidation reaction was completed. In the drawing, a point is designated at which the cooling means was shut off. This resulted in a slight rise in the temperature of the reaction mixture. Then at about the 10-minute mark, the water feed was turned on to initiate the hydrolysis reaction. The sharp rise in temperature in this point as shown in the drawing is due to the exothermic nature of the hydrolysis reaction mixture.

Example II

Following the procedure described in Example I, a dispersion of phosphorus was prepared by charging 100 grams (0.808 mole) of phosphorus and 650 ml. (11.4 moles) of acetic acid to a 1 liter stirred autoclave containing a cooling coil. The autoclave was then sealed and the mixture stirred to form a dispersion of phosphorus whose mean particle size did not exceed 2 centimeters. The dispersion was heated to about 60° C. Oxygen was introduced in the reaction mixture at about 2 grams per minute over a 50 minute period. During this reaction period, the temperature in the reactor ranged between 60° C. and 70° C. The pressure ranged from 15 to 115 p.s.i.a. The phosphorus was oxidized to an anhydride of trivalent phosphorus which reacted immediately with the acetic acid to form a phosphite intermediate reaction product. The product was removed from the autoclave, hydrolyzed by adding 1 liter of water, and refluxing for 2 hours, filtered and the filtrate was analyzed by $P^{31}$ NMR. The unoxidized phosphorus amounted to 0.05 gram indicating a conversion percentage of 99.95 percent. Analysis showed the product to be 73 mole percent orthophosphorous acid and 27 percent phosphoric acid.

Example III

Following the procedure described in Example I, a dispersion of phosphorus was prepared by charging 75 grams (.605 mole) of phosphorus and 650 ml. (11.4 moles) of acetic acid to a 1 liter stirred autoclave containing a cooling coil. The oxidation reaction was accomplished in 14 minutes at about 75° C. while the pressure was about 50 p.s.i.a. The phosphite intermediate reaction product formed by the oxidation reaction product was hydrolyzed after about a 5-minute period at which time the reaction product had a temperature of about 65° C. The hydrolyzed product was analyzed by $P^{31}$ NMR. Analysis showed that 99.7% of the phosphorus had been oxidized and that the reaction product contained 74% orthophosphorus acid and 26% phosphoric acid.

Example IV

Following the procedure described in Example I, a dispersion of phosphorus was prepared by charging 25 grams (0.202 mole) of phosphorus and 725 ml. (12.7 moles) of acetic acid to a 1 liter stirred autoclave containing a cooling coil. Oxygen was introduced as described in Example I, and essentially all the phosphorus was oxidized in 12 minutes at 70° C. The pressure during the reaction was about 115 p.s.i.a. The reaction product was removed from the autoclave and hydrolyzed after being held at about 65° C. for about 5 minutes. Excess water was used in the hydrolysis step, and analysis showed that the reaction product contained 63% orthophosphorous acid and 37% phosphoric acid.

Example V

Following the procedure described in Example I, a dispersion of phosphorus was prepared by charging 50 grams (0.404 mole) of phosphorus and 700 ml. (12.2 moles) of acetic acid to a 1 liter stirred autoclave containing a cooling coil. Oxygen was introduced in the manner described in Example I for 10 minutes at 90° C. The pressure was maintained in a range of 25–150 p.s.i.a. The resulting phosphite intermediate reaction product was maintained at a temperature of about 50° C. until excess water for hydrolysis was added after about 5 minutes. The hydrolyzed reaction product was recovered and submitted for $P^{31}$ NMR analysis. Eighty-nine percent of the phosphorus had been oxidized. The analysis showed that the reaction product consisted of 74 mole percent of orthophosphorous acid and 26% phosphoric acid.

Example VI

A dispersion of phosphorus is prepared by charging 25 grams (0.202 mole) of phosphorus, 300 ml. (5.2 moles) of acetic acid, and 350 ml. (3.6 moles) of carbon tetrachloride to a 1 liter stirred autoclave containing a cooling coil. The phosphorous particles in the dispersion have a mean diameter of less than 2 centimeters and comprise generally very fine particles. The dispersion is heated to about 80° C. and oxygen is fed into the dispersion for 15 minutes while the pressure is about 50 p.s.i.a. The oxygen introduced into the reaction mixture oxidizes the phosphorus to an anhydride of trivalent phosphorus which reacts immediately with the acetic acid to form a phosphite intermediate reaction product. The reaction temperature during the oxidation step is maintained at about 80–85° C. At the termination of the 15-minute oxidation reaction, the temperature drops sharply from about 80° C. to about 45° C. This indicates that the oxidation reaction is completed. The oxidation feed is then shut off. The phosphite intermediate reaction product is hydrolyzed by adding 100 ml. of water within about 2 minutes after the oxidation reaction is completed as evidenced by the sharp drop in temperature. The temperature rises sharply during the hydrolysis reaction to about 100° C. at which point it is refluxed for 30 minutes. The carbon tetrachloride is removed from the reaction solution by a steam distillation procedure and the resulting reaction product is analyzed by $P^{31}$ NMR. The analysis shows that the reaction product contains 75% orthophosphorous acid and 25% phosphoric acid. Most of the phosphorous acid is present in a water-soluble form.

In the preceding example, the carbon tetrachloride can be replaced with di-n-propyl sulfone, sulfolane, and di-butyl ether to provide an efficient fluid organic medium.

In all of the preceding examples, the phosphorous acid dispersion is prepared in a substantially anhydrous organic medium, i.e., containing less than 1 mole of available water per mole of phosphorus.

What is claimed is:

1. A process for the preparation of orthophosphorous acid which comprises
   (1) preparing a dispersion of phosphorus in a substantially anhydrous organic medium containing an aliphatic carboxylic acid having up to about 6 carbon atoms;
   (2) introducing an oxidizing gas into said dispersion with vigorous mixing while the disperson has a temperature in the range of from about 20° C. to about 100° C. whereby the phosphorus is oxidized in situ to an anhydride of trivalent phosphorus which reacts immediately with said aliphatic carboxylic acid to form a phosphite intermediate reaction product;
   (3) hydrolyzing said phosphite intermediate reaction product to form orthophosphorous acid by adding at least 6 moles of water per each mole of phosphorus, said hydrolysis commencing prior to substantial rearrangement of said phosphite intermediate reaction product to a product containing carbon-to-phosphorus bonds, the maximum point in time prior to which the hydrolysis step must commence being determined by the equation:

$$\text{Theta (time in minutes)} \leq 380 - \left[ \left( \frac{\text{moles phosphorus}}{\text{moles aliphatic carboxylic acid}} \right) \times (3{,}770 + 20.6T) \right]$$

T is a temperature in the range of from about 20° C. to about 100° C. at which the reaction mixture is maintained following the completion of the oxidation reaction.

2. A process described in claim 1 wherein the proportion of said aliphatic carboxylic acid to phosphorus in said anhydrous organic medium is in the range of from about 4:1 to about 80:1, by weight.

3. A process according to claim 2 wherein the proportion of said aliphatic carboxylic acid to phosphorus is in the range of from 6:1 to 40:1, by weight.

4. A process according to claim 1 in which the aliphatic carboxylic acid has from 1 to 4 carbon atoms.

5. A process described in claim 1 wherein the temperature of said dispersion while introducing said oxidizing gas is in the range of from 50° C. to 90° C.

6. A process according to claim 1 in which the rate of addition of said oxidizing gas is sufficient to provide an adsorption by the phosphorus of from about 1.5 moles of oxygen to about 4.5 moles of oxygen per mole of phosphorus and the partial pressure of said oxygen is in the range of from about 10 p.s.i.a. to about 1000 p.s.i.a.

7. A process described in claim 6 wherein the rate of addition of said oxidizing gas is sufficient to provide an adsorption by the phosphorus of from 2.5 moles of oxygen to 3.7 moles of oxygen per mole of phosphorus.

8. A process described in claim 6 wherein the partial pressure of said oxygen is in the range of 15 p.s.i.a. to 500 p.s.i.a.

9. A process described in claim 1 wherein the oxidation reaction time in Step (2) is from about 1 minute to about 2 hours.

10. A process described in claim 9 wherein the oxidation reaction time is from 2 minutes to 1 hour.

11. A process described in claim 1 wherein said substantially anhydrous organic medium also contains an inert organic solvent.

12. A process according to claim 1 in which the aliphatic carboxylic acid is acetic acid.

References Cited

UNITED STATES PATENTS

| 2,843,457 | 7/1958 | Pernert | 23—165 |
| 3,400,149 | 9/1968 | Quimby et al. | 260—502.4 |
| 3,400,150 | 9/1968 | Whyte et al. | 260—502.4 |

FOREIGN PATENTS

| 1,069,860 | 5/1967 | Great Britain. |
| 1,435,937 | 3/1966 | France. |

OSCAR R. VERTIZ, Primary Examiner

G. A. HELLER, Assistant Examiner